United States Patent [19]
Thomas

[11] Patent Number: 5,802,104
[45] Date of Patent: Sep. 1, 1998

[54] METHOD AND APPARATUS FOR VECTOR MODULATION IN A COMMUNICATION SYSTEM

[75] Inventor: John C. Thomas, Sunnyvale, Calif.

[73] Assignee: VLSI Technology, Inc., San Jose, Calif.

[21] Appl. No.: 612,689

[22] Filed: Mar. 8, 1996

[51] Int. Cl.$^6$ ............................................. H04B 1/38
[52] U.S. Cl. ................................... 375/222; 375/305
[58] Field of Search .......................... 375/222, 295, 375/302, 305, 274; 332/100, 101

[56] References Cited

U.S. PATENT DOCUMENTS 4,843,351 6/1989 Edwards et al. ..................... 375/298

Primary Examiner—Temesghen Ghebretinsae
Attorney, Agent, or Firm—Hickman & Martine, LLP

[57] ABSTRACT

A communications system includes a vector modulator controller receiving a data stream and developing a vector modulator control signal by GMSK waveform synthesis and a transmitter having a vector portion controlled by the vector modulator control signal. The vector modulator controller includes: (1) ROM memory storing a plurality of waveform maps including an alternating map, a constant map, a monotonic sine map, and a monotonic cosine map; (2) a counter coupled to the ROM memory and capable of developing a sequence of ROM addresses; (3) a temporal bit generator responsive to a data stream, the temporal bit generator developing a next bit Nb, a current bit Cb, and a past bit Pb from the data stream; (4) control circuitry to develop a digital waveform signal from selected waveform maps in the ROM memory; and (5) a pair of DACs responsive to the digital waveform signal and operative to output a vector modulator control signal that encodes the data stream. A method for providing a modulated control includes: (1) storing a plurality of waveform maps; (2) generating a plurality of temporal bits including a next bit Nb, a current bit Cb, and a past bit Pb from a data stream; (3) developing a series of addresses; (4) developing a digital waveform utilizing the Nb, Cb, and Pb bits and the sequence of digital outputs of the memory; and (5) converting the digital waveform signal to an analog vector modulator control signal that encodes the data stream.

26 Claims, 9 Drawing Sheets

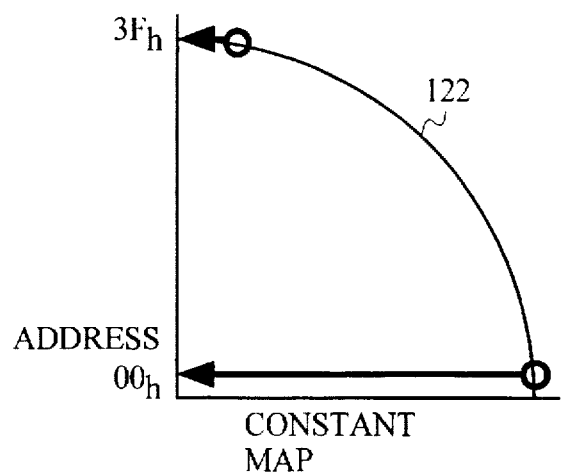
Fig. 3a CONSTANT MAP
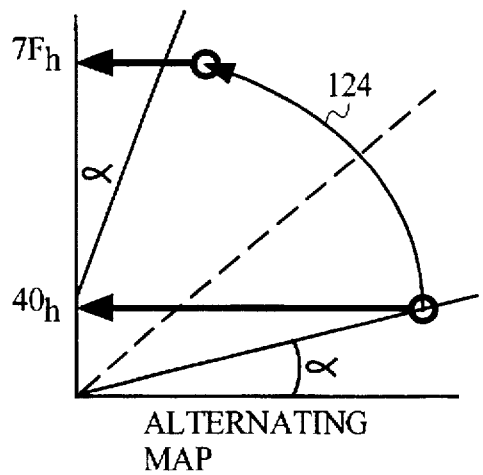
Fig. 3b ALTERNATING MAP
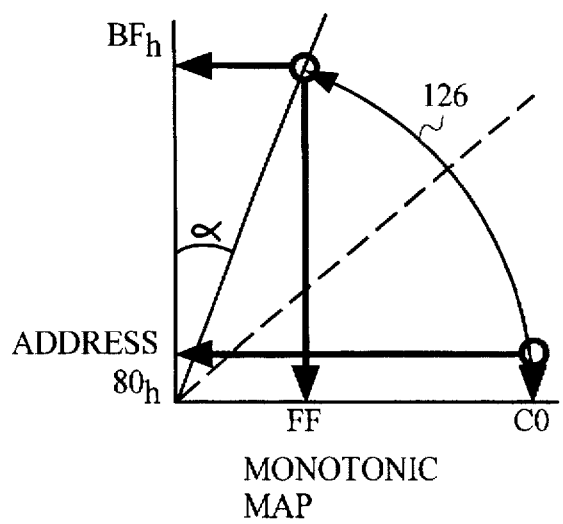
Fig. 3c MONOTONIC MAP

| Q1 | Q2 | LOCATION |
|----|----|----------|
| 0  | 0  | 1st QUADRANT |
| 0  | 1  | 2nd QUADRANT |
| 1  | 0  | 3rd QUADRANT |
| 1  | 1  | 4th QUADRANT |

PCN CODES:

| | |
|---|---|
| 111; 011 | POSITIVE QUADRANT CHANGE |
| 110; 101; 100; 010 | NO CHANGE |
| 001; 000 | NEGATIVE QUADRANT CHANGE |

METHOD AND APPARATUS FOR VECTOR MODULATION IN A COMMUNICATION SYSTEM

RELATED APPLICATIONS

This application is related to co-pending U.S. patent application 08/612.690 filed on Mar. 8,1996, entitled "Method and Apparatus for VCO Modulation in a Communication System", by inventor John Thomas, assigned to the assignee of the present application, which is incorporated herein by reference.

1. Technical Field

This invention relates generally to communications systems, and more particularly to vector controlled modulation for communications systems.

2. Background Art

Communication systems, including land-line and wireless communication systems, are increasingly based on digital transmission technologies. This is because digital transmission technologies are capable of providing higher bandwidth, lower distortion, and lower error rates than corresponding analog technologies. A number of digital standards have been adopted, including the Cellular Digital Packet Data (CDPD) standard for cellular telephones, the Frequency Division Multiple Access (FDMA) standard for land-line telephones, etc.

In a digital communication system, such as in a digital modem, it is necessary to modulate a baseband signal to carry the desired digital information on a high-frequency radio wave carrier. This is accomplished by, for example, modulating a baseband signal which serves as an input to CDPD radio circuitry.

The baseband channel frequency for CDPD transmission is approximately ±15 kHz, i.e. CDPD transmission has a channel bandwidth of about 30kHz.

Several prior art modulating methods utilize an algorithm known as Gaussian Minimum Shift Keying (GMSK) waveform synthesis. The use of GMSK waveform synthesis for vector modulation using a finite state machine and a waveform stored in read-only memory (ROM) is known. With such a system, a ROM is used to store sine and cosine values for the phase angles of a rotating phasor. The closest phase angle is determined, and the sine and cosine is read from the ROM to create a pair of control signals for a vector modulated radio transmitter.

A problem with the prior art GMSK waveform synthesis methods is that very large ROMs are required, increasing the size and cost of the circuitry. This is because many sine and cosine values are often required to obtain the desired resolution. In addition, the determination of the phase angle tends to be computationally intensive, and therefore slow and expensive. More particularly, prior GMSK baseband vector modulation systems have been burdened with relatively complex mathematical operations and large amounts of ROM necessary, for example, to map a digitized rotating phasor, rotating with variable angular velocity, into a Cartesian coordinate system. In addition, an accumulator is required in the prior art to store the current phase angle.

A problem inherent in prior art vector modulation systems is obtaining a faithful reproduction of the waveforms stored in ROM. This is because only a finite number of increments of sine and cosine values can be stored in the ROMs. Therefore, there is in inherent trade-off between ROM size and resolution in prior art vector modulation systems.

DISCLOSURE OF THE INVENTION

The present invention utilizes the symmetries present in the baseband control signal to a vector modulator to reduce the mathematical complexity and the amount of ROM to generate a vector modulated waveform. The present invention therefore allows for less complex (and therefore less expensive and more reliable) finite state machines and for less ROM to be used than was possible in the prior art. Using less ROM has the desirable effect of reducing part size and increasing memory access speed. Furthermore, a faithful reproduction of the waveforms stored in ROM is accomplished by allowing only those digital values in the ROM which are closest (in a digital sense) to the actual modulated waveforms, effectively providing a finer resolution for the waveform.

A communications system in accordance with the present invention includes a computer developing a data stream for transmission, a radio modem including a vector modulator controller receiving the data stream and developing a vector modulator control signal by GMSK waveform synthesis, a transmitter having a vector portion having an input responsive to the vector modulator control signal, and an antenna. The transmitter develops a modulated RF signal carrying the data stream in response to the vector modulator control signal, and the antenna coupled to the transmitter enhances the efficiency of transmission of the modulated RF signal.

The vector modulator controller of the radio modem of the present invention includes: (1) ROM memory storing a plurality of waveform maps including an alternating map, a constant map, a monotonic sine map, and a monotonic cosine map; (2) a counter coupled to the ROM memory and capable of developing a sequence of ROM addresses to provide a sequence of ROM memory outputs; (3) a temporal bit generator responsive to a data stream, the temporal bit generator developing a next bit Nb, a current bit Cb, and a past bit Pb from the data stream;

(4) control circuitry to develop a digital waveform signal from selected waveform maps in the ROM memory, the map selection circuitry being responsive to the Nb, Cb, and Pb bits and the sequence of ROM memory outputs; and (5) a pair of DACs responsive to the digital waveform signal and operative to output a vector modulator control signal that encodes the data stream.

A method for providing a modulated control voltage in accordance with the present invention includes the steps of: (1) storing a plurality of waveform maps in a memory including an alternating map, a constant map, a monotonic sine map, and a monotonic cosine map; (2) generating a plurality of temporal bits including a next bit Nb, a current bit Cb, and a past bit Pb from a data stream; (3) developing a series of addresses for the memory to create a sequence of digital outputs; (4) developing a digital waveform utilizing the Nb, Cb, and Pb bits and the sequence of digital outputs of the memory; and (5) converting the digital waveform signal to an analog vector modulator control signal that encodes the data stream.

A method for making a communications system in accordance with the present invention includes the steps of: (1) providing a ROM memory on a semiconductor substrate that stores a plurality of waveform maps; (2) providing a counter on the substrate that is coupled to the ROM memory and which is capable of developing a sequence of ROM addresses to provide a sequence of ROM memory outputs; (3) providing a temporal bit generator on the substrate that is responsive to a data stream, the temporal bit generator developing a next bit Nb, a current bit Cb, and a past bit Pb from the data stream; (4) providing control circuitry on the substrate to develop a digital waveform signal from selected waveform maps in the ROM memory, the control circuitry being responsive to the Nb, Cb, and Pb bits and the sequence of ROM memory outputs; and (5) providing a pair of DACs on the substrate that is responsive to the digital waveform signal and operative to output a vector modulator control signal including an I signal and a Q signal that encodes the data stream.

As will be apparent from the foregoing discussion, the present invention provides a modulated baseband signal for a digital communication system in a fashion that is less computationally intensive and one which requires less memory than similar circuits of the prior art. In addition, the present invention obtains a faithful reproduction of the waveforms stored in the ROM, resulting in less distortion to the transmitted signals.

These and other advantages of the present invention will become apparent upon reading the following detailed descriptions and studying the various figures of the drawings.

BRIEF DESCRIPTION OF THE DRAWINGS

FIGS. 3a, 3b, and 3c are phase diagrams illustrating the constant, alternating, and monotonic maps of the present invention;

BEST MODES FOR CARRYING OUT THE INVENTION

Figure 1:
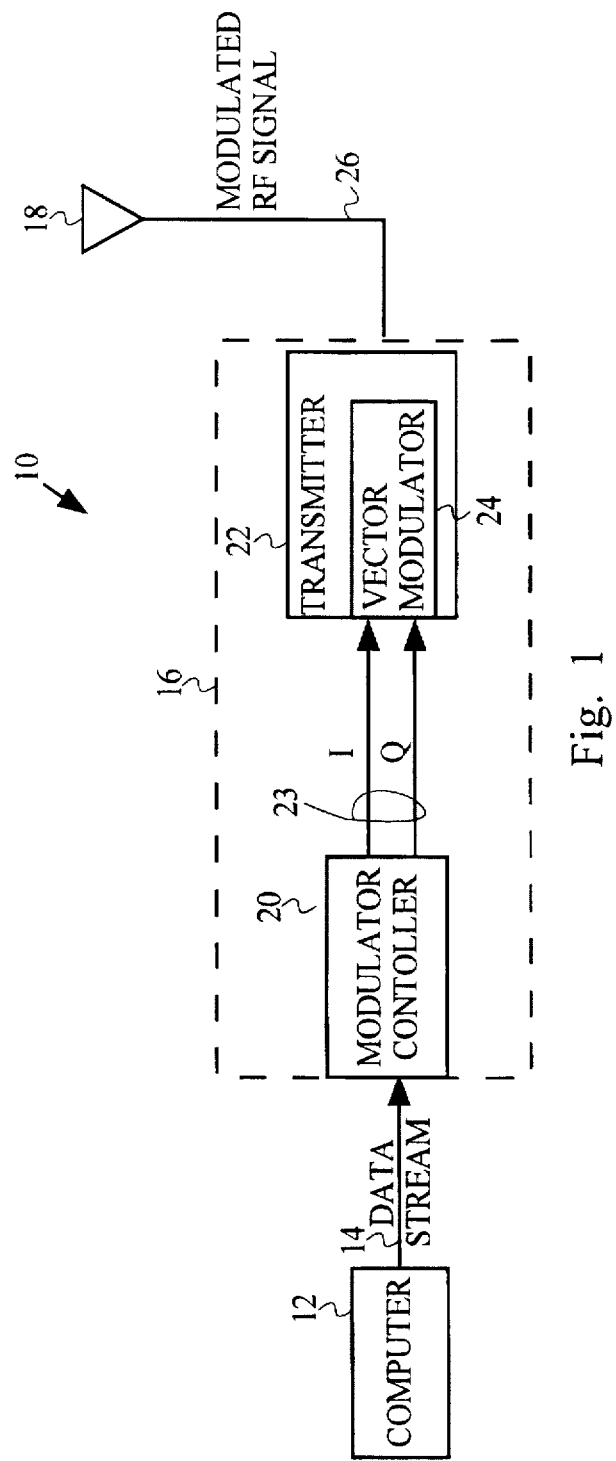
FIG. 1 is a block diagram of a digital communication system 10 in accordance with the present invention.

A digital communication system 10 in accordance with the present invention includes a computer 12 creating a data stream 14. The present invention also includes a radio modem 16 that is responsive to the data stream 14 and which is operative to transmit the data stream via a transmitting antenna 18. Thus, the present invention is concerned with the transmission of digital information, preferably over a wireless communication channel, such as a cellular telephone system.

The computer 12 can be any suitable digital processing system, such as a personal computer. It is often desirable to be able to transmit serial data as a "data stream" to other computer systems. To accomplish this task, a radio modem, such as the radio modem 16 of the present invention, can be used.

Radio modem 16 includes a modulator controller 20 and a transmitter 22. In the present invention, the transmitter 22 has, as an input, a vector modulator portion 24 which allows the modulation of a high frequency carrier signal with the digital information in the data stream 14. Radio modems currently have a data transfer rate of about 19.2 kilobits/second ("baud"). The design and manufacture of transmitters, such as transmitter 22, with vector modulators, is well known to those skilled in the art.

As mentioned previously, the modulator controller 20 of the present invention, receives, as an input, the data stream 14 from computer 12. The modulator controller produces a pair of vector modulator control signals 23 (labeled "I" and "Q") which serve as a control inputs to the vector modulator portion 24 of the transmitter 22. The vector modulator control signal 23 causes a modulation of a high frequency carrier signal to provide a modulated radio frequency (RF) signal 26 which radiates from antenna 16. For cellular systems, the high frequency carrier signal has a frequency of about 900 MHz, and the modulation of the high frequency carrier signal is approximately ±15 kHz. Both I and Q signals are provided to generate a phase modulated signal when combined by the vector modulator 24, as is well known to those skilled in the art.

In operation, the computer 12 implements a connection with a receiving modem of a remote computer system (not shown). The computer 12 then sends ("transmits") the data stream 14 to the modulator controller 20 of the radio modem 16 which develops the vector modulator control signals 23, thereby causing the vector modulator portion 24 to modulate the high frequency radio signal generated by transmitter 22 to create the modulated RF signal 26. This modulated RF signal 26 is transmitted to the remote computer via the antenna 18.

The computer 12, transmitter 22 (including vector modulator portion 24), antenna 18, and cellular system described previously are all conventional systems well known to those skilled in the art. The present invention is directed to an improved vector modulator controller 20, which forms a portion of an improved radio modem 16, which forms a portion of in improved communication systems 10.

Figure 2:
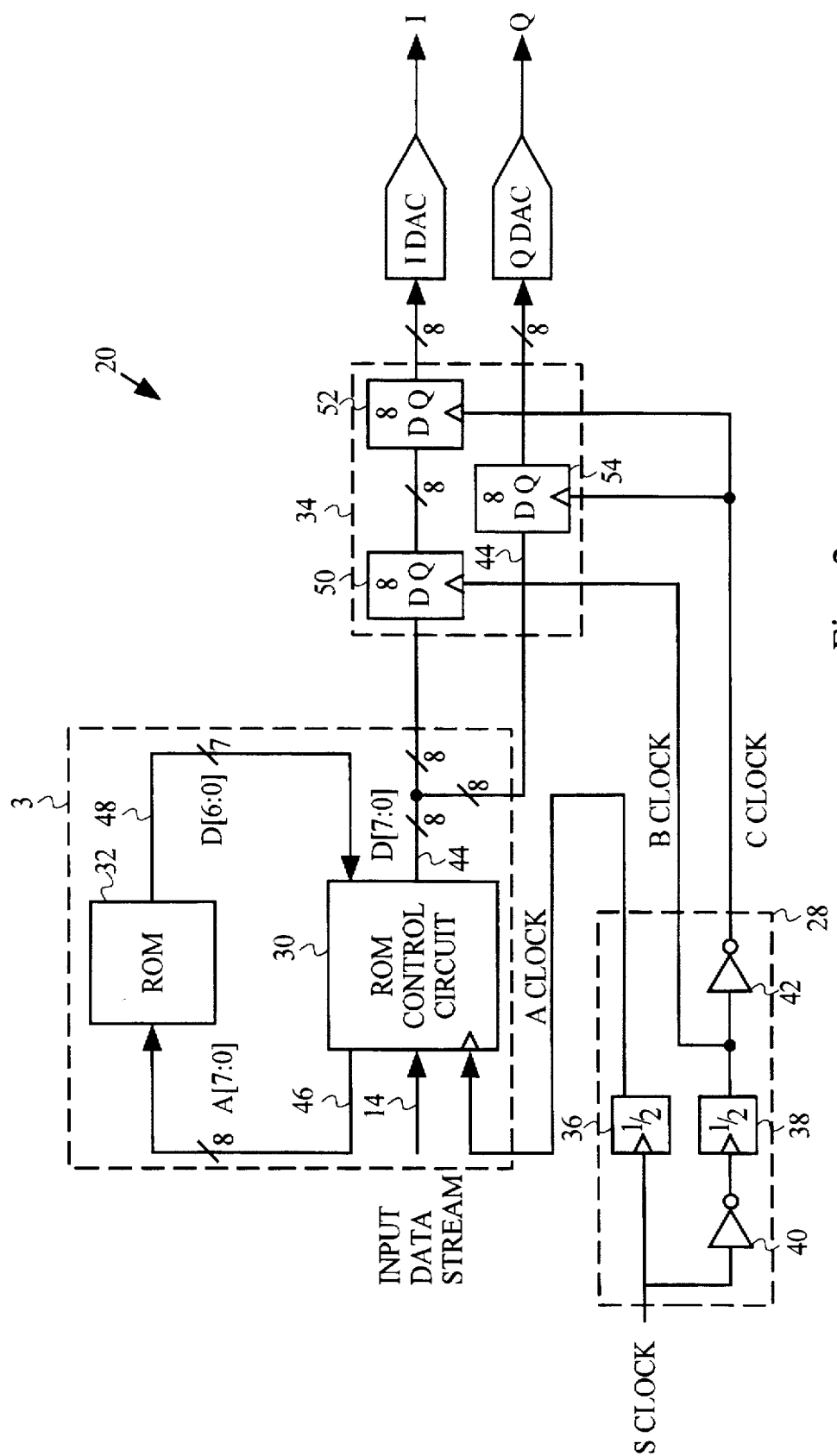
FIG. 2 is a block diagram of the modulator controller 20 of the digital communication system 10 illustrated of FIG. 1.

In FIG. 2, a modulator controller 20 in accordance with the present invention includes a clock generator 28, a ROM control circuit 30, a ROM 32, an output stage 34, and two digital-to-analog converters (DACs), labeled "I DAC" and "Q DAC." The I DAC produces the aforementioned I signal, and the Q DAC produces the aforementioned Q signal for the vector modulator portion 44 of transmitter 22 (see FIG. 1). Essentially, the I DAC and the Q DAC are being multiplexed by the output stage 34, where the I DAC gets the cosine values, and the Q DAC gets the sine values. As noted in FIG. 2A, flip-flop 50, coupled to the B CLOCK, picks off the cosine values. The flip-flop 54, coupled to the C CLOCK, picks of the sine values. 25 The output stage 34, in addition to performing the multiplexing function, also prevents "race" situations by presenting the data cleanly to the DACs. The I DAC and Q DAC are preferably true 8-bit DACs.

The clock generator 28 includes two toggle flip-flops 36 and 38, and two inverters, 40 and 42. The flip-flops 36 and 38 are labeled "½" to indicate that they serve as "divide by two" counters. The clocking input of flip-flop 36 is coupled to the system clock S CLOCK, and the clocking input of flip-flop 38 is coupled to the system clock S CLOCK by inverter 40. In the present invention, the frequency of S CLOCK is 128×19.2 kHz=2.4576 MHz. The output of the flip-flop 36 will be referred to as the "A CLOCK," which is ½ the frequency of the system clock. The output of flip-flop 38 will be referred to as the "B CLOCK," and is also ½ the frequency of S CLOCK. A third clock, known as the "C CLOCK" is coupled to the output of flip-flop 38 by the inverter 42. C CLOCK is the inverse of B CLOCK.

The ROM control circuit 30 has, as an input, the input data stream and is clocked by the A CLOCK. The ROM control circuit has an output of data D[7:0] on an 8-bit bus 44. The ROM control circuit also has an output of address A[7:0] on a 8-bit bus 46. The 8-bit bus 46 is used to address ROM 32, which produces an output on a 7-bit bus 48 of data D[6:0]. The 7-bit bus is an input of the ROM control circuit 30.

The output stage 34 include 8-bit flip-flop registers, 50, 52, and 54. In other words, each of the flip-flop registers 50, 52 and 54 include 8 flip-flops, each of which is responsive to one of a bit line. More particularly, the eight D inputs to flip-flop registers 50 are coupled to the bus 44, and the eight Q outputs of the flip-flop register 50 are coupled to the eight D inputs of the flip-flop register 52. The eight Q outputs of the flip-flop register 52 are coupled to the I DAC. The flip-flop register 50 is clocked by the B CLOCK, and the flip-flop register 52 is clocked by the C CLOCK. The flip-flop register 54 have its D inputs coupled to the data bus 44, and have its Q outputs coupled to the Q DAC. The flip-flop register 54 is clocked by the C CLOCK.

Figure 2A:
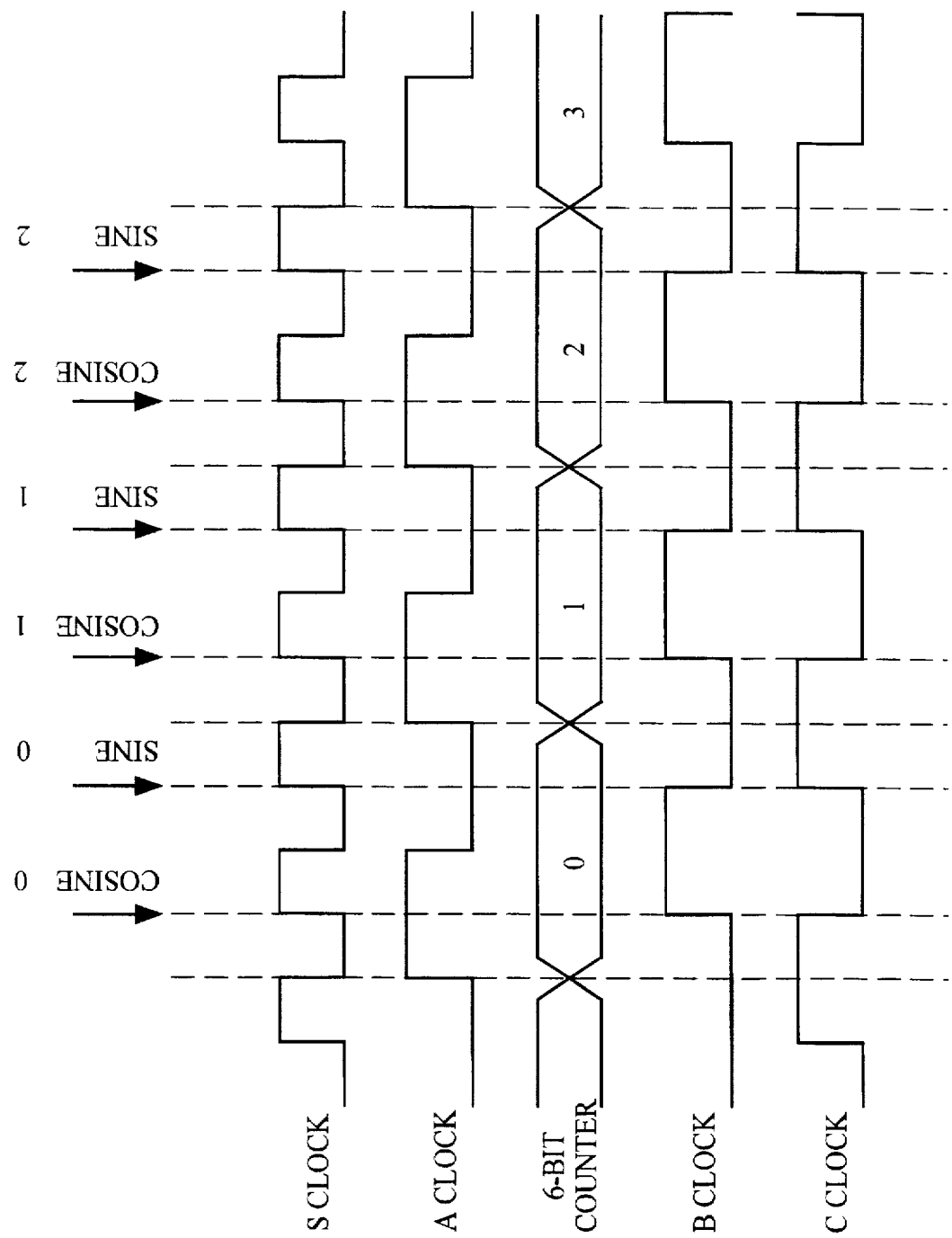
FIG. 2a is a timing diagram illustrating the clocks and counter of the modulator controller 20 of FIG. 2.

FIG. 2a is a timing diagram for the circuit of FIG. 2. It will be noted that the S CLOCK is at twice the frequency of the A CLOCK, B CLOCK, and C CLOCK. It will also be noted that the B CLOCK is 90 degrees ahead of the A CLOCK, and that the C clock is 90 degrees behind the A CLOCK. As mentioned previously, the B clock selects the cosine values, while the C CLOCK clocks the sine values.

Figure 3:
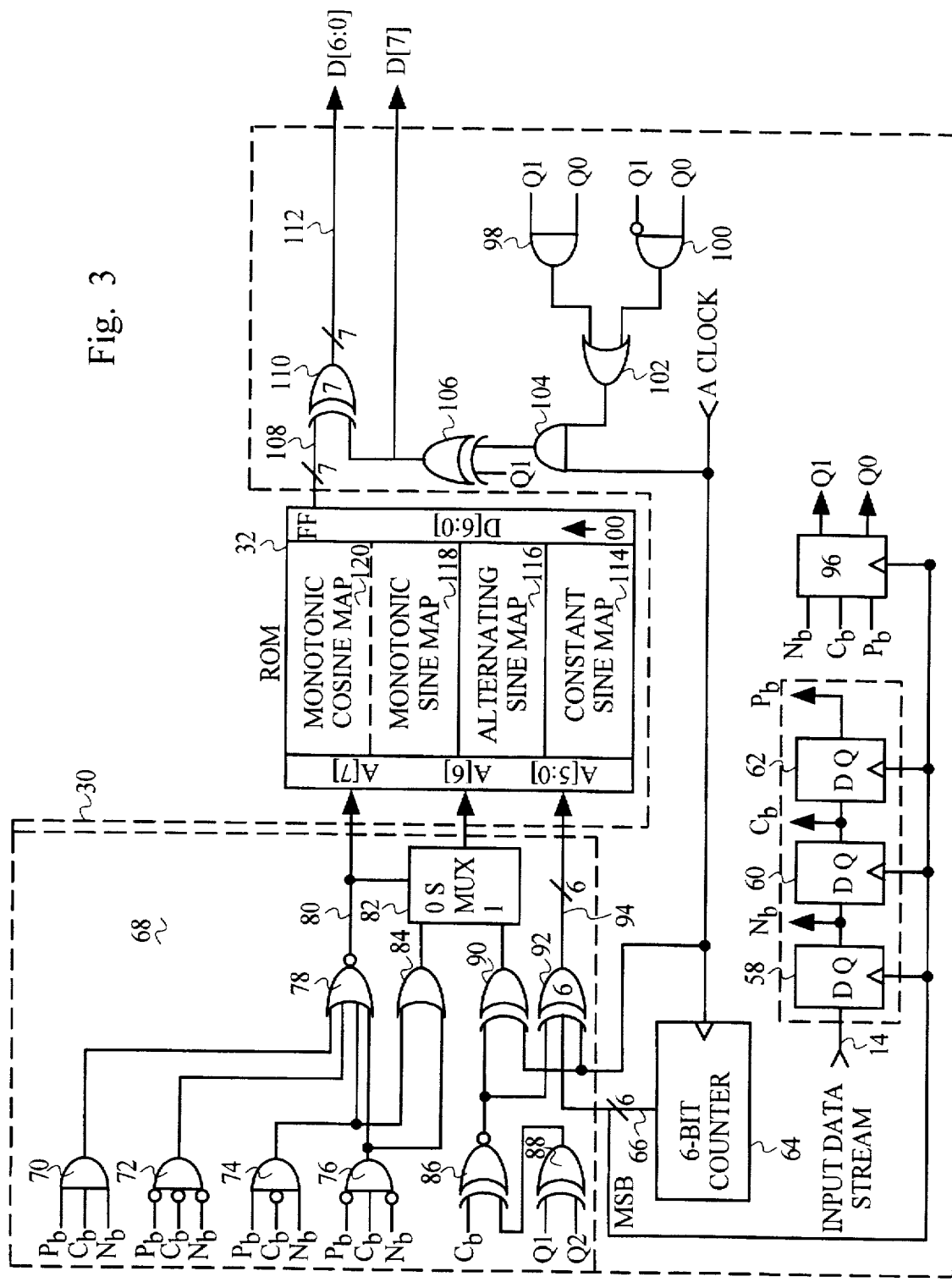
FIG. 3 is a block diagram and schematic illustrating the ROM control circuit 30 and ROM 32 of the modulator controller 20 of FIG. 2 in greater detail.

In FIG. 3, the ROM control circuit 30 and ROM 32 of FIG. 2 are illustrated in greater detail. More particularly, ROM control circuit 30 includes a temporal bit generator 56 including 3 flip-flops 58, 60, and 62. The D input of the flip-flop 58 is coupled to the input data stream 14, and the Q output of flip-flop 58 is coupled to the D input of the flip-flop 60. The Q output of flip-flop 60 is coupled to the D input of the flip-flop 62, and all three flip-flops 58, 60, and 62 are clocked by the most significant bit (MSB) produced by a 6-bit counter 64. The Q output of flip-flop 58 develops the "next bit" Nb, the Q output of flip-flop 60 develops the "current bit" Cb, and the Q output of flip-flop 62 develops the "past" bit Pb. The use of the bits Mb, Cb, and Pb will be discussed in greater detail subsequently.

The 6-bit counter is directly clocked by the A CLOCK. Therefore, the 6-bit counter is always on, and is always counting from 000000 to 111111. The output of the 6-bit counter 64 is developed on a 6-bit bus 66. The most significant bit (MSB) of this bus (i.e. the 6th bit) clocks the flip-flops 58, 60, and 62.

Both the A CLOCK and the 6-bit bus 66 serve as inputs to map selection circuitry 68. More particularly, the circuitry 68 determines whether the proper map to be used is a monotonic cosine map, a monotonic sine map, an alternating sine map, or a constant sine map. The map selection circuitry 68 includes a pair of AND gates 70 and 72 which determine whether a constant map is specified. More particularly, bits Pb, Cb, and Nb are coupled to the non-inverting inputs of AND gate 70, and the same bits are coupled to the inverting inputs of AND gate 72. Therefore, if the three bits are all 1's or all 0's, one of the two gates 70 and 72 will produce a one ("1" or "high" or "HI") at its output. The map selection circuitry 68 also includes AND gates 74 and 76 which are also coupled to the bits Pb, Cb, and Nb. The AND gate 74 has non-inverting inputs coupled to Pb and Nb, and an inverting input coupled to Cb, and AND gate 76 has inverting inputs coupled to bits Pb and Nb, and a non-inverting input coupled to Cb The AND gates 74 and 76 detect whether the map is alternating, i.e. is alternating zeros and ones. If any one of the outputs of AND gates 70–76 is high, the output of NOR gate 78 is low. If all of the outputs of AND gates 70–76 are low, the output of NOR gate 78 is high indicating that the map is neither constant nor alternating, i.e. the proper map is the only remaining type of map: a monotonic map. The output of NOR gate 78 on a line 80 controls address bit A[7] of ROM 32 and the select ("S") input of a multiplexer (MUX 82).

The map selection circuitry 68 further includes an OR gate 84 having inputs coupled to the outputs of AND gates 74 and 76. The output of the OR gate 84 is coupled to the zero input of MUX 82. This signal can be fed to a second most significant address bit A[6] by MUX 82 to allow the selection of the alternating sign map. This will happen if the map is not monotonic, as determined by the output of NOR gate 78 on line 80.

If the map is monotonic as determined by the value on line 80, a XNOR gate 86 and two XOR gates 88 and 90 determine the value on address bit A[6].

More particularly, the inputs of XOR 88 are coupled to quadrant lines Q0 and Q1.

The generation of the quadrant lines will be discussed subsequently. The output of XOR 88 is combined with bit Cb in XOR 86. The output of XNOR 86 is combined with the A CLOCK in XNOR 90 to produce the signal for the "1" input to MUX 85.

From the foregoing, it will be apparent that the bit A[7] selects between the top and bottom memory locations of ROM memory 32. The bit A[6] then selects between the top and bottom sections of the top and bottom memory locations of the ROM memory 32. The combination of the two address bits A[7] and A[6] selects the particular map (i.e. they select one of the four possible maps) stored in ROM memory 32.

Finally, the map selection circuitry 68 further includes a 6-bit XOR 92 coupled to the 6-bit bus 66, to the A CLOCK, and to the output of XNOR 86. A output bus 94 of the 6-bit XOR 92 is coupled to the six least significant address bit A[5:0]. The 6-bit bus addresses memory locations within the map selected by the two address bits A[7] and A[6].

The ROM control circuit 30 further includes a quadrant generator 96 (discussed in greater detail with reference to FIG. 5) which produces quadrant signals Q1 and Q0 from the bits and Nb, Cb, and Pb. The quadrant generator 96 is clocked by the MSB output of the 6-bit counter 64. The Q0 and Q1 signals serve as inputs to XOR gate 88, and also serve as inputs to AND gates 98 and 100. More particularly, Q0 and Q1 are coupled to non-inverting inputs of AND gate 98. Q0 is coupled to a non-inverting input of AND gate 100, and Q1 is coupled to an inverting input of AND gate 100. The outputs of AND gates 98 and 100 are combined in NOR gate 102 to produce an output that is combined with the A CLOCK in an AND gate 104. The output of the AND gate 104 is combined with the Q1 signal in an XOR gate 106, the output of which is data bit D[7]. The output of XOR gate 106 is combined with the 7-bit output bus 108 of the ROM 32 in an XOR gate 110 to produce an output data bus 112 comprising the data bits D[6:0].

The ROM 32 is preferably one, large ROM logically divided into segments 114, 116, 118, and 120. The first segment 114 of the in the low ROM memory is the constant sine map, the second segment 116 is the alternating sine map, the third segment 118 is the monotonic sine map, and the fourth segment 120 is a monotonic cosine map. Of course, in other embodiments, these maps can be arranged differently. In the present embodiment, the constant sine map in segment 114 stores data from hexadecimal 00 to 3F, the alternating sine map in segment 116 stores data from hexadecimal 40 to 7F, the monotonic sine map 118 stores data from hexadecimal 80 to BF, and the monotonic cosine map 120 stores data from hexadecimal C0 to FF. The ROM 32 is addressed by the map selection circuitry 68 as described previously. The output of the ROM 32 is 7 bits of data D|6:0| and is developed on the bus 108.

FIGS. 3a, 3b, and 3c illustrate the constant map, alternating map, and monotonic map of the present invention. In the constant map of FIG. 3a, a curve 122 ranging from 0 to π/2 radians is swept out by the tip of a rotating vector (not shown for clarity). The sine value is taken from the vertical ("y") axis at a address value of between hexadecimal 00 and 3F in the ROM. Only sine values are required in the constant map, since the cosine values can be obtained by shifting the sine values by π/2 radians (90 degrees). In the alternating map of FIG. 3b, a curve 124 is swept out by the tip of an alternating vector (also not shown) between the angles of α and π/2−α radians. In the present invention, α≈0.3316 radians, (i.e. about 19°). The address values range from about hexadecimal 40 to 7F. Again, only the sine values taken along the y axis are required for the alternating map, since the cosine values can be derived from the sine values. In the monotonic map of FIG. 3c, a tip of a vector (not shown) sweeps out a curve 126 that ranges from 0 to α/2−α radians. Since the monotonic map is not symmetrical, both sine and cosine values need to be derived. The sine address, taken along the y axis, ranges from hexadecimal 80 to BF. The cosine address, taken along the horizontal or "x" axis, ranges from hexadecimal FF to C0.

As noted above, the constant map (a "swept out" circle at a constant rate) and the alternating map (a curve bouncing between offset angles α) are symmetric around the π/4 (i.e. the 45°) axis, so that the cosine can be obtained from the sine. Since the monotonic map is not symmetric, its requires both cosine and sine values for each point. Alternatively, for the constant and alternating maps, cosine values could be stored, and the sine values could be derived from the stored cosine values.

Figures 4A, 4B, 4C:
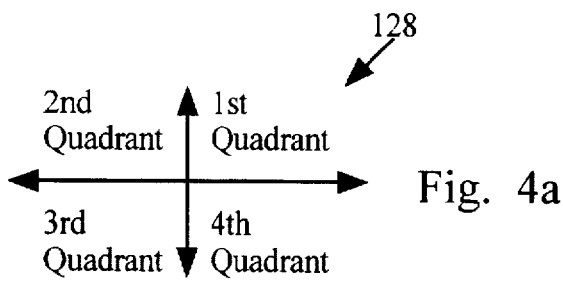
FIGS. 4a, 4b, and 4c illustrate the quadrant nomenclature, quadrant codes, and quadrant change (PCN) codes of the present invention.

The significance of quadrants and quadrant changes will be discussed with reference to FIGS. 4a–4c. Since the sine and cosine values coming our from the ROM are interleaved, the order in which sine and cosine words are output depends upon which quadrant the vector is in. In FIG. 4a, a Cartesian-type mapping 128 illustrates that the first quadrant is in the upper right hand corner, the second quadrant is in the upper left hand corner, the third quadrant is in the lower left hand corner, the fourth quadrant is in the lower right hand corner. Therefore, the quadrant descriptions used herein follow standard mathematical nomenclature. If, for example, the vector is in the first quadrant, a cosine map is chosen first, and then a sine map is chosen coming out of the quadrant. If the vector is in the second quadrant, the map choice is reversed. The methodology as illustrated by these examples affects the constant and alternating maps similarly as well as the monotonic sine and cosine maps. In addition, the quadrant affects the sign of the values coming out of ROM memory.

In FIG. 4b, a table 130 shows how the various quadrants are encoded in the present invention. The code for a location in the first quadrant is (Q1, Q0)=(0, 0), the code for a location in the second quadrant is (Q1, Q0)=(1,1), a code for a location in the third quadrant is (Q1,Q0)=(1,0), and a code for a location in the fourth quadrant is (Q1,Q0)=(1,1). These codes are arbitrary, but the particular logic of the circuitry disclosed herein follows these conventions.

In FIG. 4c, a table 132 lists a number of "PCN" codes. By "PCN" codes it is meant herein codes relating to the past bit Pb, the current bit Cb, and the next bit Nb. Of course, only the current bit Cb is being transmitted at any particular point in time. As table 132 indicates, a PCN code of 111 or 011 indicates a positive quadrant change. A PCN code of 110, 101, 100, and 010 indicates no change. Finally, a PCN code of 001 or 000 indicates a negative quadrant change. The significance of the quadrant change will be further discussed subsequently by way of example.

Figure 5:
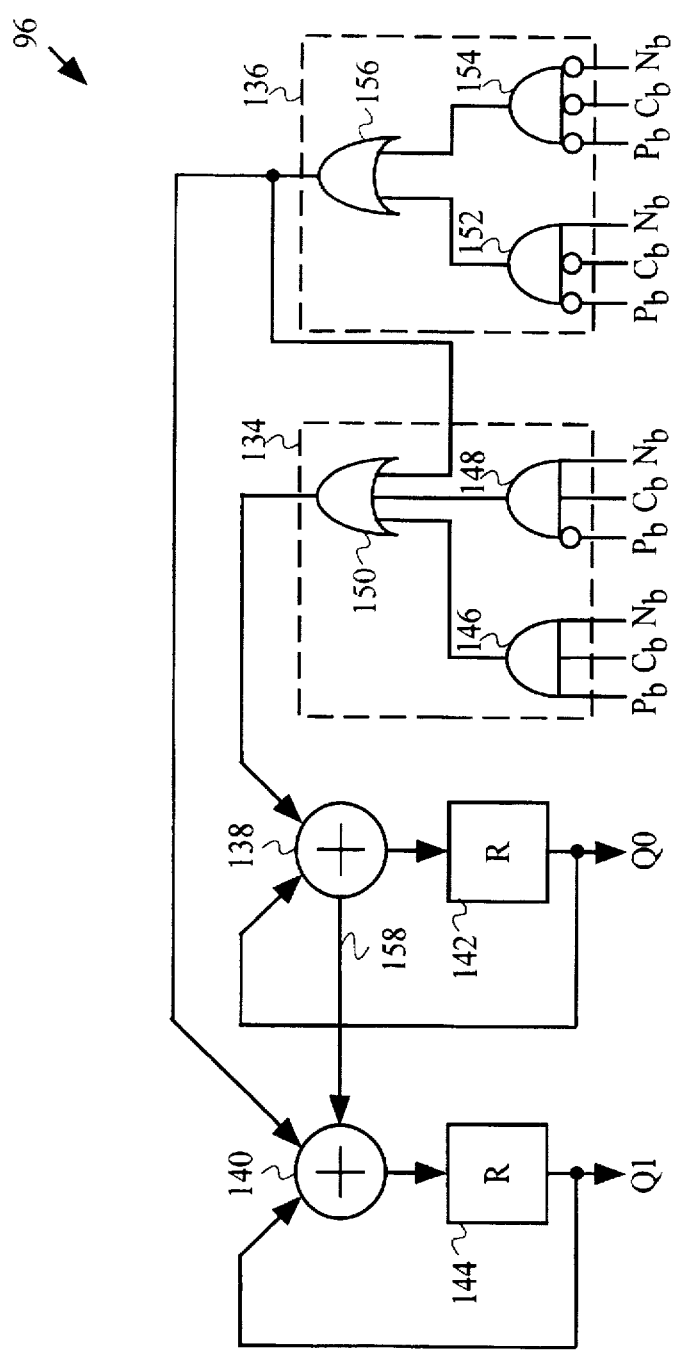
FIG. 5 is a block diagram and schematic illustrating the quadrant code generating circuit 96 the ROM control circuit of FIG. 3 in greater detail.

In FIG. 5, the quadrant generator 96 of FIG. 3 is shown in greater detail. More particularly, the quadrant generator includes an "add one" circuit 134, a "subtract one" circuit 136, a pair of adders 138 and 140, and a pair of registers 142 and 144 coupled to the outputs of the adders 138 and 140, respectively. The add one circuit 134 includes a pair of AND gates 146 and 148 and an OR gate 150. The bits Pb, Cb, and Nb are coupled to the non-inverting inputs of AND gate 146. The bit Pb is coupled to an inverting input of AND gate 148, and bits Cb and Nb are coupled to non-inverting inputs of AND gate 148. The outputs of AND gate 146 and 148 are coupled to inputs of OR gate 150.

The subtract one circuit 136 includes two AND gates 152 and 154 and an OR gate 156. The bits Pb and Cb are coupled to inverting inputs of AND gate 152, and the bit Nb is coupled to a non-inverting input of AND gate 152. The bits Pb, Cb, and Nb are all coupled to inverting inputs of AND gate 154. The outputs of AND gates 152 and 154 are coupled to an input of OR gate 156, which forms a third input to the OR gate 150 of the add one circuit 134.

The output of OR gate 150 forms an input for adder 138 along with an output of register 152. In other words, the output of the add one circuit 134 is combined with the previous state stored in the register 142. If the previous state in register 142 was a zero, and add one signal from add one circuit 134 will change the bit in register in 142 to a one. If the bit in register in 142 was already a one, the signal from the add one circuit 134 will change the bit in register 142 to a zero and would create a "carry" signal on a line 158.

The output of subtract one circuitry 136 is coupled to the adder 140 along with the carry 158 and the feed-back from register 144. The combination of the three signals produces the Q1 signal of the output of register 144, just as the output of register 142 is the Q0 signal.

Figure 6:
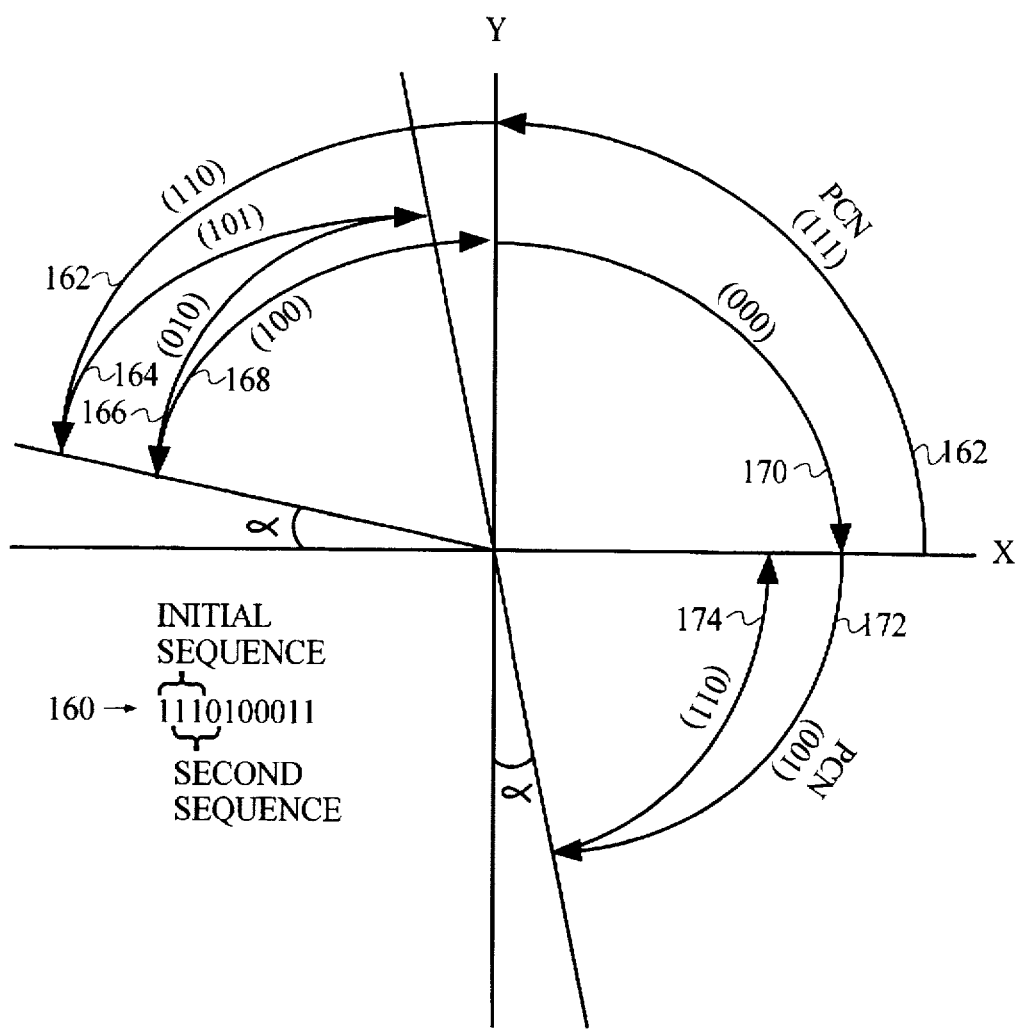
FIG. 6 is a phase diagram illustrating, by way of a specific example, the method for using maps to create a vector modulator control signal in accordance with the present invention.

The process of the present invention with regards to the generation of the vector modulator control signals from the various maps stored in ROM will be discussed with reference to FIG. 6. In the graph of FIG. 6, assume a data stream 160 of 1110100011. The "initial sequence" of this data stream is therefore "111." Each adjacent three bits form a PCN as described previously. The initial sequence "111" creates the constant mapped curve 162. Note that this map causes a rotation from 0 to π/2, initiating a quadrant change from quadrant 1 to quadrant 2. A second sequence "110" then causes a rotation to π−α where, again, α is approximately 0.3316 radians (19°), as shown by the alternating mapped curve 162.

The significant of α is that is the angle (in an alternating map) where the vector slows down, stops, and reverses direction. The value of α is calculated for GMSK by simulation, as is well known to those skilled in the art. A variety of angles are tested, and the angle α that minimizes phase distortion is chosen. Since the bits in the data stream are alternating for the next two sequences, the alternating mapped curves 164 and 166 bounce back and forth between $\pi/2 +\alpha$ and $\pi-\alpha$ in the second quadrant as illustrated. Curve 168 reflects a monotonic map, and initiates a quadrant change to quadrant 1. Curve 170 is a constant mapped curve, and initiates a quadrant change to quadrant 4. Curves 172 and 174 reflects the remaining two monotonic maps "001" and "011", respectively, which initiates a final quadrant change to quadrant 1.

Figure 7:
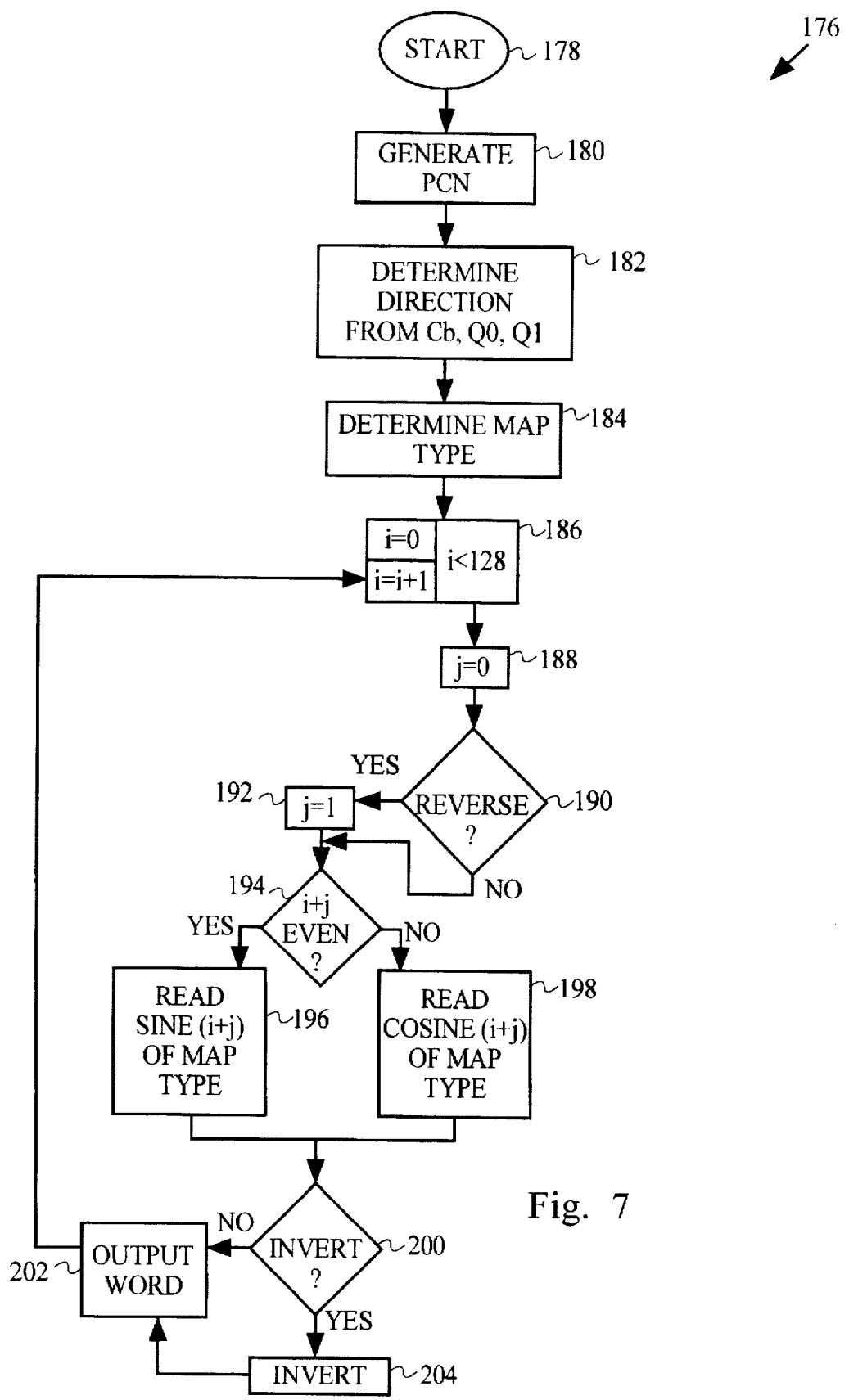
FIG. 7 is a process flow diagram illustrating a process for data communication in accordance with the present invention.

In FIG. 7, a process 176 for data communication in accordance with the present invention is shown in the form of a process flow diagram. More particularly, the process 176 begins at 178 and, in a step 180 the PCN (i.e. the bits Pb, Cb, and Nb) are generated. This can be accomplished in the temporal bit generator 56 of FIG. 3. Next, in a step 182, the "direction" the data that is to be read from ROM memory is determined (i.e. either a "forward" or a "reverse" direction). Gates 86 and 88 of FIG. 3 can be used to perform this step. In a step 184, the map type is determined, which involves the gates 70–78 of FIG. 3. Next, interative loop step 186 reads out 128 words from the ROM memory corresponding to 64 sine values and 64 cosine values. This is accomplished in the circuit illustrated in FIG. 3 by providing 128 addresses on address bus 66. A step 188 sets a variable "j" to zero. Step 190 branches on whether the read order for the ROM memory is to be reversed, as was previously determined in step 182. If the read order is to be reversed, j is set to one. This is accomplished in the NOR gate 92, which takes the 1's complement of the address on the bus 66 if the direction in which the ROM 32 is to be reversed. Next, a step 194 determines if the sum of i+j is an even number. This is to permit the multiplexing of the sine and cosine values of the ROM (i.e. the alternating outputting of sine and cosine values from the I DAC and Q DAC, respectively). This can be accomplished by the output stage 34 of FIG. 2. If i+j is even, then the (i+j)th sine value of the selected map type is read from the ROM 32. If i+j is odd, then the (i+j)th cosine value of the selected map type is read from the ROM 32. A step 200 determines if the word is to be inverted. If it is, step 202 performs the inversion step. If there is no inversion, or after the inversion step 202 is performed, the word is output in a step 204. The iterative loop 186 is then repeated until 128 words have be read from memory.

While this invention has been described in terms of several preferred embodiments, there are alterations, permutations, and equivalents which fall within the scope of this invention. It should also be noted that there are may alternative ways of implementing both the process and apparatus of the present invention. It is therefore intended that the following appended claims be interpreted as including all such alterations, permutations, and equivalents as fall within the true spirit and scope of the present invention.

I claim:

1. A communications system comprising:
   a computer developing a data stream for transmission;
   a radio modem comprising:
   a) a vector modulator controller coupled to said computer to receive said data stream, said vector modulator controller developing a vector modulator control signal by GMSK waveform synthesis, said vector modulator controller including:
      1) ROM memory storing a plurality of waveform maps including an alternating map, a constant map, a monotonic sine map, and a monotonic cosine map;
      2) a counter coupled to said ROM memory and capable of developing a sequence of ROM addresses to provide a sequence of ROM memory outputs;
      3) a temporal bit generator responsive to said data stream, said temporal bit generator developing a next bit Nb, a current bit Cb, and a past bit Pb from said data stream;
      4) control circuitry to select a waveform map from said plurality of waveform maps in said ROM memory and to develop a digital waveform signal from said selected waveform map, said control circuitry being responsive to said Nb, Cb, and Pb bits and said sequence of ROM memory outputs; and
      5) a pair of DACs responsive to said digital waveform signal and operative to output the vector modulator control signal that encodes said data stream; and
   b) a transmitter having a vector portion, said vector portion having an input responsive to said vector modulator control signal, said transmitter developing a modulated RF signal carrying said data stream in response to said vector modulator control signal; and
   an antenna coupled to said transmitter of said radio modem for transmission of said modulated RF signal.

2. The communications system as recited in claim 1 wherein said plurality of maps are stored in said ROM memory in a minimalistic fashion taking advantage of symmetry in said maps.

3. The communications system as recited in claim 2 wherein said alternating map comprises a plurality of sine values, and wherein said constant map comprises a plurality of sine values.

4. The communications system as recited in claim 3 wherein said control circuitry derives a plurality of alternating map cosine values from said alternating map sine values, and derives a plurality of constant map cosine values from said constant map sine values.

5. A radio modem comprising:
   (a) a vector modulator controller receptive to a data stream, said vector modulator controller developing a vector modulator control signal by GMSK waveform synthesis, said vector modulator controller including:
      1) ROM memory storing a plurality of waveform maps including an alternating map, a constant map, a monotonic sine map, and a monotonic cosine map;
      2) a counter coupled to said ROM memory and capable of developing a sequence of ROM addresses to provide a sequence of ROM memory outputs;
      3) a temporal bit generator responsive to said data stream, said temporal bit generator developing a next bit Nb, a current bit Cb, and a past bit Pb from said data stream;
      4) control circuitry to select a waveform map from said plurality of waveform maps in said ROM memory and to develop a digital waveform signal from said selected waveform map, said control circuitry being responsive to said Nb, Cb, and Pb bits and said sequence of ROM memory outputs; and
      5) a pair of DACs responsive to said digital waveform signal and operative to output the vector modulator control signal that encodes said data stream; and
   (b) a transmitter having a vector portion, said vector portion having an input responsive to said vector modulator control signal, said transmitter developing a modulated RF signal carrying said data stream in response to said vector modulator control signal.

6. The radio modem as recited in claim 5 wherein said plurality of maps are stored in said ROM memory in a minimalistic fashion taking advantage of symmetry in said maps.

7. The radio modem as recited in claim 6 wherein said alternating map comprises a plurality of sine values, and wherein said constant map comprises a plurality of sine values.

8. The radio modem as recited in claim 7 wherein said control circuitry derives a plurality of alternating map cosine values from said alternating map sine values, and derives a plurality of constant map cosine values from said constant map sine values.

9. A vector modulator controller comprising:

ROM memory storing a plurality of waveform maps including an alternating map, a constant map, a monotonic sine map, and a monotonic cosine map;

a counter coupled to said ROM memory and capable of developing a sequence of ROM addresses to provide a sequence of ROM memory outputs;

a temporal bit generator responsive to a data stream, said temporal bit generator developing a next bit Nb, a current bit Cb, and a past bit Pb from said data stream;

control circuitry to select a waveform map among said plurality of waveform maps in said ROM memory and to develop a digital waveform signal from said selected waveform map, said control circuitry being responsive to said Nb, Cb, and Pb bits and said sequence of ROM memory outputs; and a DAC responsive to said digital waveform signal and operative to output a vector modulator control signal that encodes said data stream.

10. The vector modulator controller as recited in claim 9 wherein said alternating map is an alternating sine map, and wherein said constant map is a constant sine map.

11. The vector modulator controller as recited in claim 9 wherein said ROM memory comprises a single ROM memory for all of said waveform maps.

12. The vector modulator controller as recited in claim 9 wherein said alternating map is an alternating sine map, and wherein said constant map is a constant sine map, and wherein said control circuitry develops an alternating cosine map from said alternating sine map and a constant cosine map from said constant sine map.

13. The vector modulator controller as recited in claim 12 wherein said plurality of maps are stored in said ROM memory in a minimalistic fashion taking advantage of symmetry in said maps.

14. The vector modulator controller as recited in claim 13 further comprising a quadrant generator for determining a current quadrant of said maps.

15. The vector modulator controller as recited in claim 14 further comprising a PCN code for describing a current map in said current quadrant.

16. A vector modulator controller comprising storing means for storing a plurality of waveform maps;

generating means for generating a plurality of temporal bits including a next bit Nb, a current bit Cb, and a past bit Pb from a data stream;

addressing means for developing a series of addresses for said storing means to create a sequence of digital outputs from said storing means;

developing means for selecting a waveform map from said plurality of waveform maps in said storing means and for developing a digital waveform signal from said selected waveform map, said developing means being responsive to said Nb, Cb, and Pb bits and said sequence of digital outputs of said storage means; and conversion means responsive to said digital waveform signal and operative to develop an analog vector modulator control signal that encodes said data stream.

17. The vector modulator controller as recited in claim 16 wherein said storing means includes an alternating map, a constant map, a monotonic sine map, and a monotonic cosine map.

18. The vector modulator controller as recited in claim 17 wherein said storing means includes a single ROM memory for all of said waveform maps.

19. The vector modulator controller as recited in claim 18 wherein said alternating map is an alternating sine map, and wherein said constant map is a constant sine map, and wherein said developing means develops an alternating cosine map from said alternating sine map and a constant cosine map from said constant sine map.

20. The vector modulator controller as recited in claim 19 wherein said plurality of maps are stored in said ROM memory in a minimalistic fashion taking advantage of symmetry in said maps.

21. A method for providing a modulated control voltage comprising:

storing a plurality of waveform maps in a memory including an alternating map, a constant map, a monotonic sine map, and a monotonic cosine map;

generating a plurality of temporal bits including a next bit Nb, a current bit Cb, and a past bit Pb from a data stream;

developing a series of addresses for said memory to create a sequence of digital outputs;

developing a digital waveform signal utilizing said Nb, Cb, and Pb bits and said sequence of digital outputs of said memory; and converting said digital waveform signal to an analog vector modulator control signal that encodes said data stream.

22. The method for providing a modulated control voltage as recited in claim 21 wherein said storing said plurality of waveform maps comprises:

generating said alternating map, said constant map, said monotonic sine map, and said monotonic cosine map;

encoding at least portions of said maps; and storing said encoded portions of said maps in said memory.

23. The method for providing a modulated control voltage as recited in claim 22 wherein said alternating map is an alternating sine map, and wherein said constant map is a constant sine map, and wherein said digital waveform signal developing step develops an alternating cosine map from said alternating sine map and a constant cosine map from said constant sine map by reading.

24. A method for making a communications system comprising:

providing a ROM memory on a semiconductor substrate that stores a plurality of waveform maps;

providing a counter on said substrate that is coupled to said ROM memory and which is capable of developing a sequence of ROM addresses to provide a sequence of ROM memory outputs;

providing a temporal bit generator on said substrate that is responsive to a data stream, said temporal bit generator developing a next bit Nb, a current bit Cb, and a past bit Pb from said data stream;

providing control circuitry on said substrate to develop a digital waveform signal from selected waveform maps in said ROM memory, said control circuitry being responsive to said Nb, Cb, and Pb bits and said sequence of ROM memory outputs; and providing a pair of DACs on said substrate that is responsive to said digital waveform signal and operative to output a vector modulator control signal including an I signal and a Q signal that encodes said data stream.

25. The method for making a communications system as recited in claim 24 further comprising:

provinding a transmitter having a vector portion responsive to said vector modulator control signal, said transmitter developing a modulated RF signal for wireless transmission of said data stream.

26. The method for making a communications system as recited in claim 25 further comprising:

coupling a computer providing said data stream to said temporal bit generator; and coupling an antenna to said transmitter to enhance the efficiency of said wireless transmission of said data stream.

* * * * *

UNITED STATES PATENT AND TRADEMARK OFFICE
CERTIFICATE OF CORRRECTION

PATENT NO. : 5,802,104
DATED : September 1, 1998
INVENTOR(S) : Thomas It is certified that error appears in the above-identified patent and that said Letters Patent is hereby corrected as shown below:

On the title page, item [56] insert

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 2 | 1 | 6 | 3 | 9 | 1 | 6/93 | Shiraishi et al. | | | |
| | | | | | | | | | | | | | |

Signed and Sealed this

Sixth Day of April, 1999

Attest:

Attesting Officer

Q. TODD DICKINSON

Acting Commissioner of Patents and Trademarks